(12) United States Patent
Kolluru

(10) Patent No.: US 6,327,698 B1
(45) Date of Patent: Dec. 4, 2001

(54) METHOD FOR INTEGRATING MODELS IN A MODELLING TOOL INTO AN OBJECT ORIENTED REPOSITORY

(75) Inventor: Nookaiah Venkatabutchi Kolluru, Irvine, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/219,614

(22) Filed: Dec. 23, 1998

(51) Int. Cl.[7] ................................................. G06F 9/44
(52) U.S. Cl. ................................................................ 717/1
(58) Field of Search ..................................................... 717/1

(56) References Cited

U.S. PATENT DOCUMENTS

| | | | |
|---|---|---|---|
| 5,557,793 | * | 9/1996 | Koerber ................................ 707/103 |
| 5,644,764 | * | 7/1997 | Johnson et al. ....................... 707/103 |
| 5,848,273 | * | 12/1998 | Fontana et al. ........................ 717/1 |
| 6,003,039 | * | 12/1999 | Barry et al. ........................... 707/103 |
| 6,038,393 | * | 3/2000 | Iyengar et al. ......................... 717/1 |
| 6,061,515 | * | 5/2000 | Chang et al. ........................... 717/2 |
| 6,167,405 | * | 12/2000 | Rosensteel, Jr. et al. ............ 707/102 |
| 6,256,773 | * | 7/2001 | Bowman-Amuah ................... 717/1 |

FOREIGN PATENT DOCUMENTS

0769739 * 4/1997 (EP) ................................ G06F/9/44

* cited by examiner

*Primary Examiner*—Kakali Chaki
*Assistant Examiner*—John Q. Chavis
(74) *Attorney, Agent, or Firm*—Alfred W. Kozak; Mark T. Starr; Lise A. Rode (57) ABSTRACT

A method is disclosed for use in a software development system having a repository, wherein the method uses an object-oriented tool to capture models from and populate models in the repository. The method includes the steps of importing a first software model from the repository into the object-oriented tool; disposing the imported first software model in the object-oriented tool for development by a user a second software model based upon the first software model; and, exporting the second software model to the repository.

26 Claims, 11 Drawing Sheets

METHOD FOR INTEGRATING MODELS IN A MODELLING TOOL INTO AN OBJECT ORIENTED REPOSITORY

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to a method and system for generating interfaces to a repository for adapting and using any tool for operation with the repository; and, in particular, it relates to a method and system for using third party tools to build, develop and maintain software models stored inside the repository.

BACKGROUND OF THE INVENTION

Repositories provide a central place for recording metadata. Repositories enable one to store, manage, share and reuse information (metadata) about information systems that the enterprise uses. The repository can store definitional, management and operational information. Tools can be integrated with the repository to support information sharing and metadata reuse. Tool and technology models are developed to manipulate the tool information in the repository. Designing and analyzing repository models has been a cumbersome and unyielding task for a long time.

Repository models typically contain classes, datatypes and messages. There is no easy way to view the model being designed and observe how the current model interacts with other models. It has been difficult to realize the impact analysis. Without a pictorial view of the repository model being developed, it is very difficult to understand the system. Until now, repository models were developed mostly using a text editor. As complex models are built, the need for a tool that provides the capabilities to design, analyze and build models has become more evident. The present invention comprises a new and improved method for populating models from Object-Oriented Case tools into repositories.

SUMMARY OF THE INVENTION

In accordance with the present invention, a method is provided for use in a software development system having a repository, wherein the method uses an object-oriented tool to capture models from and populate models in the repository. The method includes the steps of importing a first software model from the repository into the object-oriented tool; disposing the imported first software model in the object-oriented tool for development by a user a second software model based upon the first software model; and, exporting the second software model to the repository.

It is an object of the present invention to provide repositories with capabilities that support industry standard tools in order to analyze, design and build repository models.

It is an object of the present invention to provide repositories with capabilities that support industry standard tools in order to analyze, design and build repository models.

Yet another object of the present invention is to provide users with capabilities to choose a third party tool object model and export it into a repository.

A feature of the present invention is to allow the user the flexibility of switching to a different object oriented analysis and design tool, as and when necessary, rather than the one tied to the repository.

Another feature of the present invention is to provide interoperability of the object oriented analysis and design tool in order to support the analysis, design and building of repository models across all platforms.

Yet another feature of the present invention is the provision of synchronization by supporting reconciliation of any difference between a model's definition stored in the repository's metadata and the model's definition stored in any model definition file that the third party tool independently maintains.

An advantage of the present invention is the ability to make repositories capable of integrating various software tools into a computer system framework.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently. The term populating refers to the creating of instances of model components in the repository.

Figure 1:
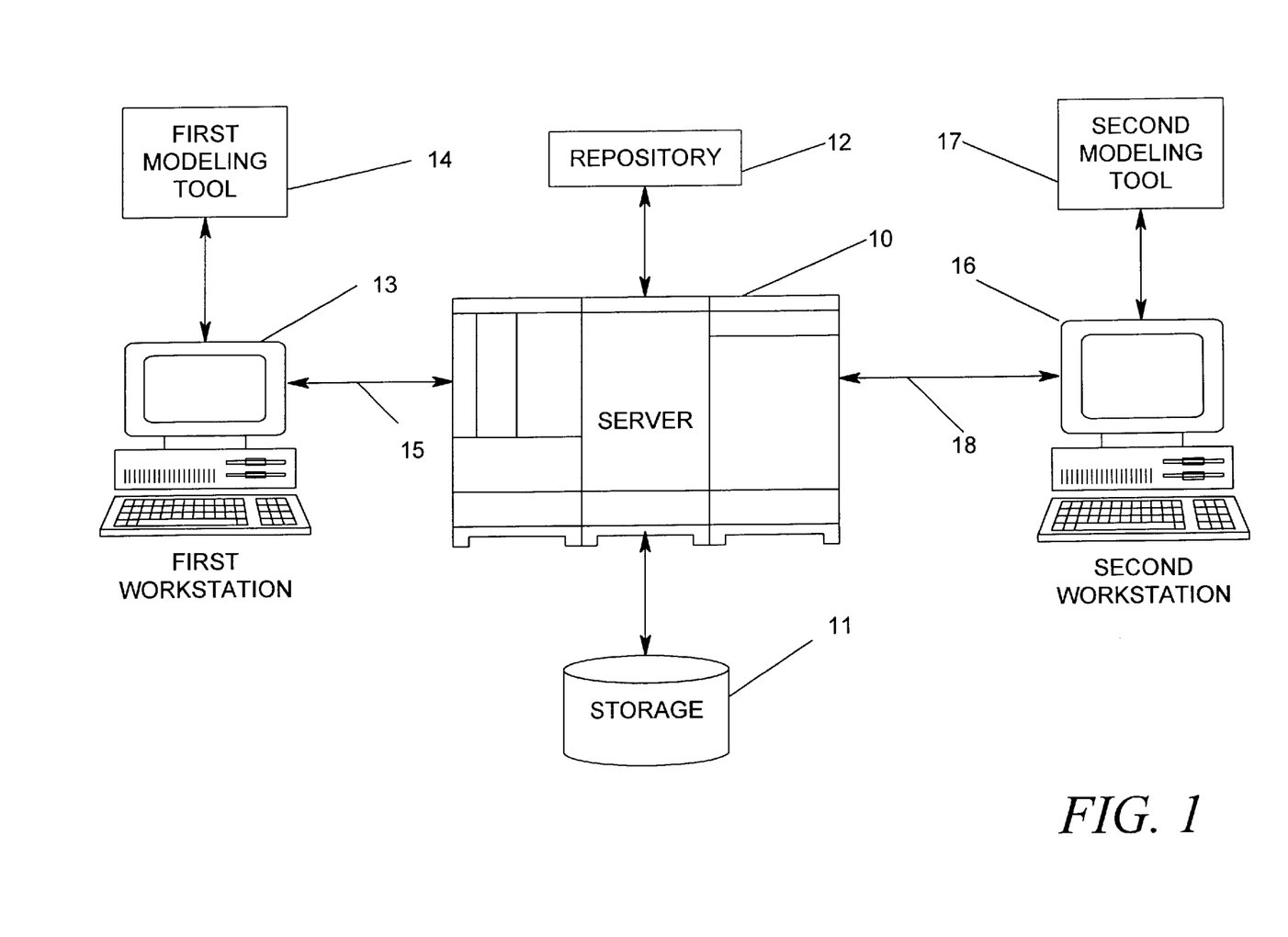
FIG. 1 is a block diagram of a computer system that may employ the present invention.

Referring now to FIG. 1, a block diagram of a system that may employ the present invention is shown. A computer system, or server 10, is shown coupled to a storage device 11, which in the illustrated embodiment contains a database. The computer 10 is capable of executing a variety of software programs, including a repository program 12.

The repository program 12 is a specialized, extensible object-oriented database application that adds value to a database system, which allows customization of a particular domain (such as application development). The repository program 12 is capable of accessing the database in the storage device 11 for obtaining modeling data stored therein.

The repository program 12 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITH A VERSION TREE DEPICTING A HISTORY OF SYSTEM DATA AND PROCESSES FOR AN ENTERPRISE; U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; U.S. Pat. No. 6,038,393, for TOOL-INDEPENDENT APPLICATION DEVELOPMENT; and, U.S. Pat. No. 6,018,627, for EXCHANGING INFORMATION BETWEEN DIFFERENT OBJECT MODELS AND UML; each of which are hereby incorporated by reference as if set forth in full herein.

The method of the present invention, which is an improvement to the repository program 12, provides a mechanism for representing a concept that is too large or complex to describe as a single entity. This mechanism includes modeling, which represents the concept as a set of components and the relationships between these components. Models are abstractions of real-world concepts such as ideas, objects or systems. Typically, models are used to describe, design and document systems such as a reservation system for an airline, a banking system or a patient-information system for a hospital. Information models represent the information processed or managed by enterprises. An information model represents an enterprise as a set of related components, called types, and the relationship among the types. The types provide templates defining the structure of the information and the services provided by the model. The information model of the present invention defines information that can be stored in the repository. It also identifies the services provided by the repository and the tool and technology models supported thereby.

In accordance with the hardware arrangement for executing the present invention, a first workstation 13 executing a first modeling tool 14 is coupled to the server 10 by a link 15. In a similar manner a second workstation 16 executing a second modeling tool 17 is coupled to the server 10 by a link 18.

Figure 2:
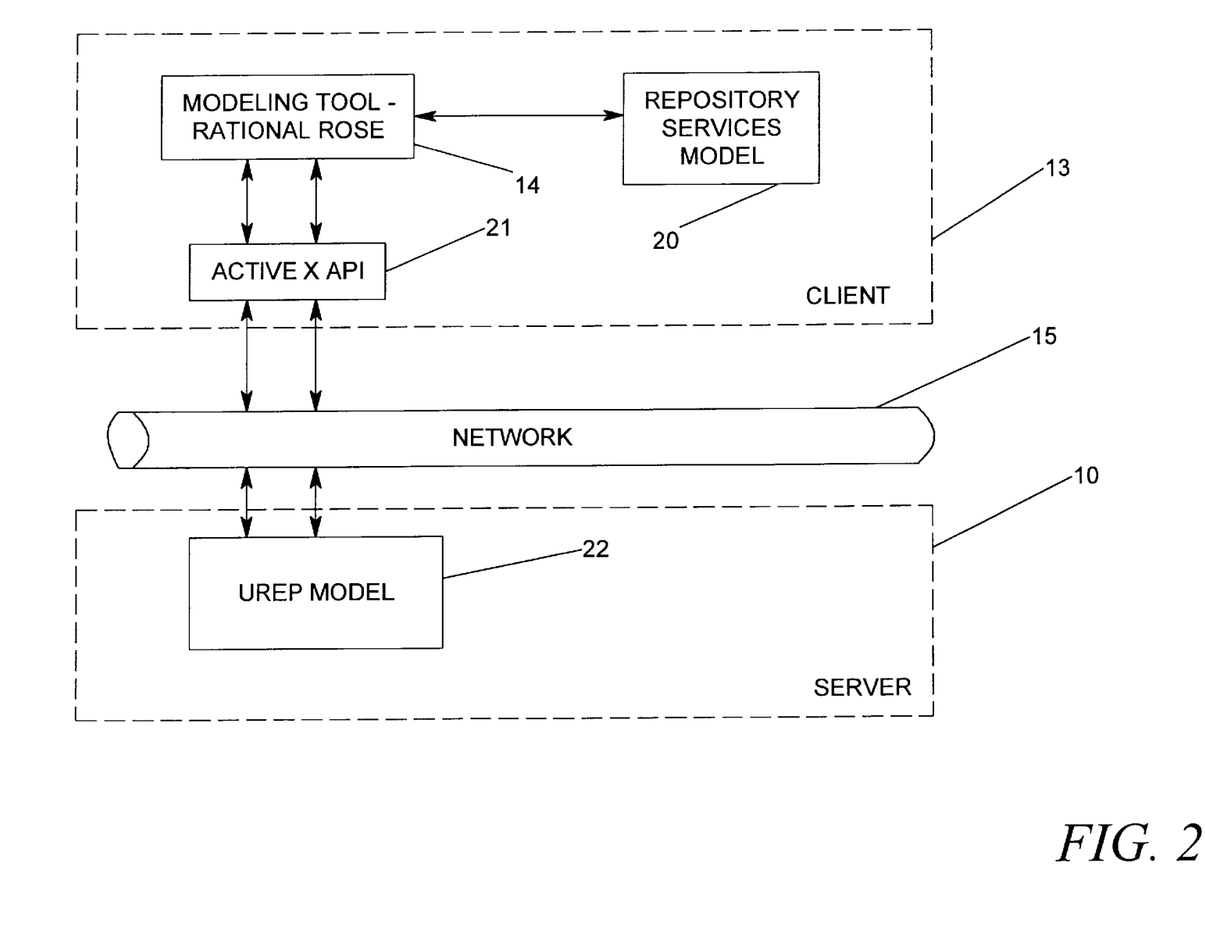
FIG. 2 is a software module block diagram of one particular embodiment of a software development environment that may employ the present invention.

Referring now to FIG. 2, a software module block diagram of one particular embodiment of a software development environment that may employ the present invention is shown. A client, such as the workstation 13, is coupled to the server 10 by means of a network 15. The client 13 and the server 10 communicate with each other over the network 15, which can be a standard network like the TCP/IP or the Internet. The memory of the client 13 includes a third party object oriented analysis and design tool referred to herein as the modeling tool 14. An exemplary modeling tool 14 may comprise Rational Rose, which is available from Rational Software Corporation of Cupertino, Calif. The Rational Rose modeling tool communicates with a Repository Services Model (RSM) 20, which is a part of the repository 12. The RSM 20 is the main model of UREP 22 (a repository tool available from the assignee hereof) and acts as a guiding framework for building other models inside the repository 12. The Rational Rose modeling tool 14 also communicates with an Active X API software module 21, which is an Active X Application Process Interface, i.e., a utility developed with Active X available from Microsoft Corporation of Redmond, Wash. The Active X API communicates through an OLE connection (Object Linking and Embedding connection) available from Microsoft Corporation of Redmond, Wash.) over the network 15 with the repository (UREP 22) stored in the server 10.

Figure 3:
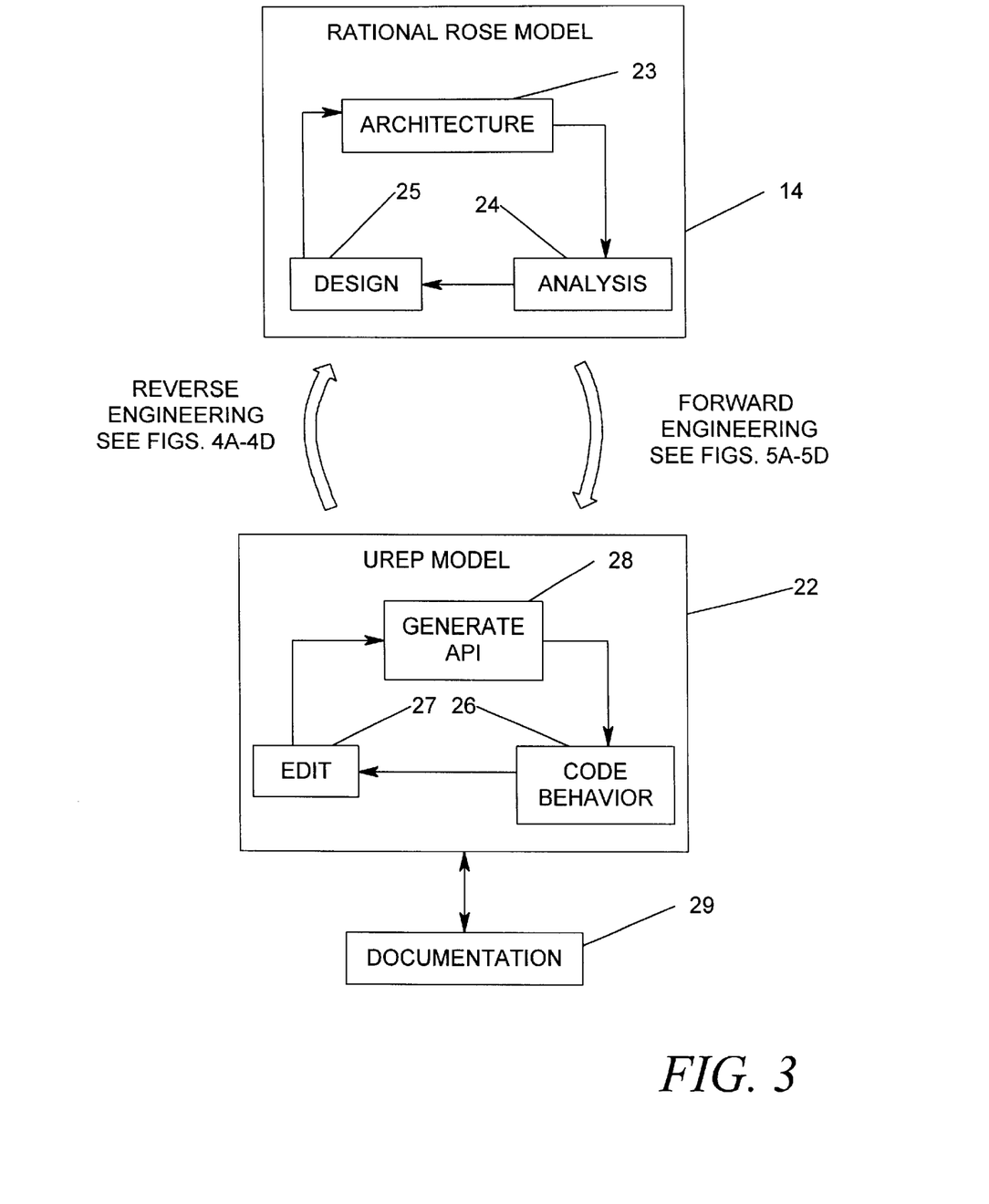
FIG. 3 is a process-flow block diagram of one particular embodiment of a software development environment that may employ the present invention.

Referring now to FIG. 3, a process-flow block diagram of one particular embodiment of a software development environment that may employ the present invention is shown. The diagram illustrates a schematic of the process for integration of the Rational Rose modeling tool 14 and the UREP 22 repository. This arrangement will allow developers to express their business needs graphically using Rose and forward engineer the models into working object oriented client-server solutions within the UREP 22 repository. In addition, developers can reuse existing UREP based solutions by reverse engineering those solutions into Rose object models for incorporation into new or existing solutions.

The processes undertaken by Rational Rose are illustrated within the Rational Rose model 14 and the processes undertaken by the repository are illustrated within the UREP model 22. The application model to be worked upon is defined in an architecture software module 23 within the Rational Rose model 14 using UML technology. UML, or "Unified Modeling Language", is a set of analysis and design notations that are rapidly becoming a de-facto industry standard for Object Oriented Analysis and Design.

The architecture module 23 adds UREP specific characteristics to the model. The model can than be analyzed and designed through an analysis module 24 and a design module 25, respectively. After this, the model is validated and forward engineered to the UREP 22. That is, the model is exported to the UREP 22, which operation will be illustrated in greater detail hereinafter in conjunction with a description of FIGS. 5A through 5D.

In the UREP environment, the model's behavior is coded through a code behavior module 26. The model is also edited through an edit module 27 and application process interfaces are generated through a generate API module 28 for different language bindings. The generate API module 28 also serves to build libraries for the model. The modified application model is then reverse engineered into the Rational Rose model 14 for further analysis and design. That is, the model is imported into Rational Rose model 14, which process will be illustrated in greater detail hereinafter in conjunction with the description of FIGS. 4A through 4D. The new Rose model can again be extended and forward engineered to UREP to follow the iterative development process. As the model is being developed in Rose, it can also be documented as denoted by a documentation module 29. The documentation is exported to UREP during the Export part of the process, as will be amplified hereinafter, and captured in the repository 12.

Referring now to FIGS. 4A through 4D, the process for importing a repository model from a repository to a third party modeling tool is illustrated. The process begins with a start bubble 34 followed by a step of getting LogIn parameters from the user (block 35). Next, an inquiry is made as to whether or not the parameters obtained are valid (diamond 36). If they are not valid, then errors are displayed (block 37) and the process ends (bubble 38). On the other hand, if the parameters are valid, then a LogIn is made to the repository UREP 22 (block 39). After this, the model to be imported from UREP is selected (block 40). Next, dependent models of the selected models are found (block 41). An inquiry is then made as to whether or not there are any dependent models (diamond 42). If the answer to this inquiry is yes, then a branch is taken to FIG. 4B as denoted by a connector A. On the other hand, if the answer to this inquiry is no, then a branch is taken to another part of the process illustrated in FIG. 4B as denoted by a connector B.

Figure 4A:
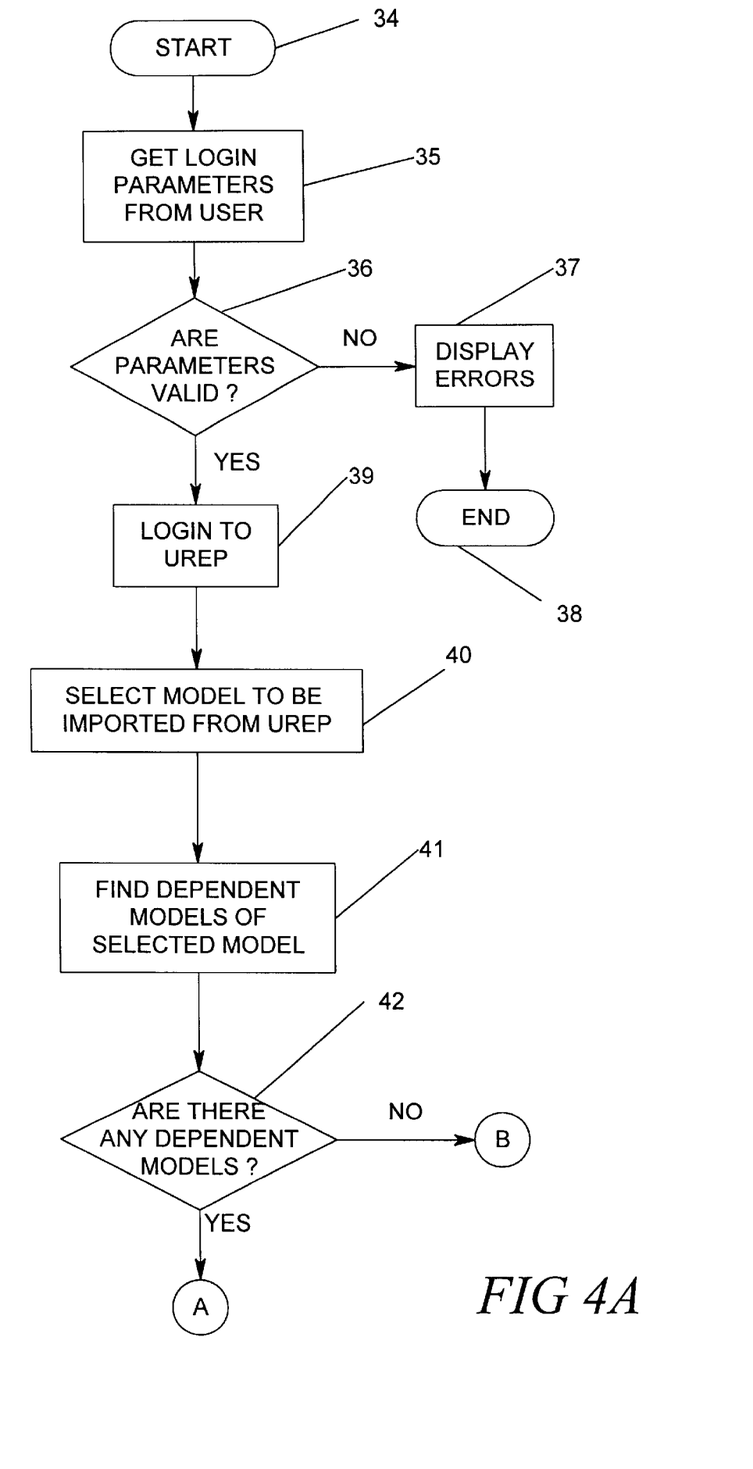
FIGS 4A through 4D combined form a flow chart illustrating the process of importing a repository model from a repository to a third party modeling tool of one particular embodiment of the present invention.
Figure 4B:
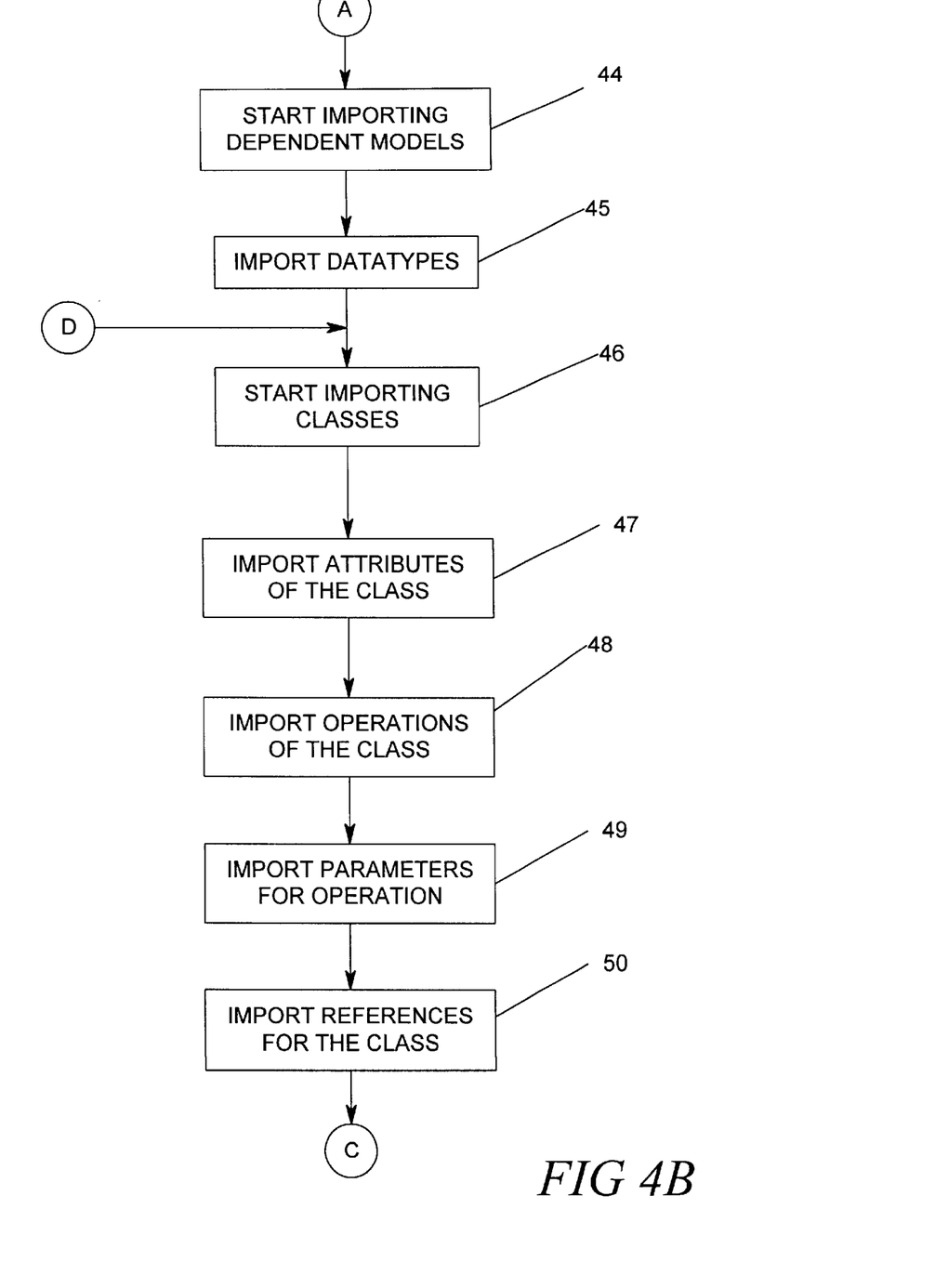

Referring now to FIG. 4B at the connector A, the step of importing dependent models is begun (block 44). Next, datatypes are imported (block 45). After this, the importing of classes is begun (block 46) followed by a step of importing attributes of the class (block 47). Operations of classes are imported next (block 48) followed by a step of importing parameters for operations (block 49). References for the class are then imported (block 50). The process illustration continues in FIG. 4C as denoted by a connector C.

Figure 4C:
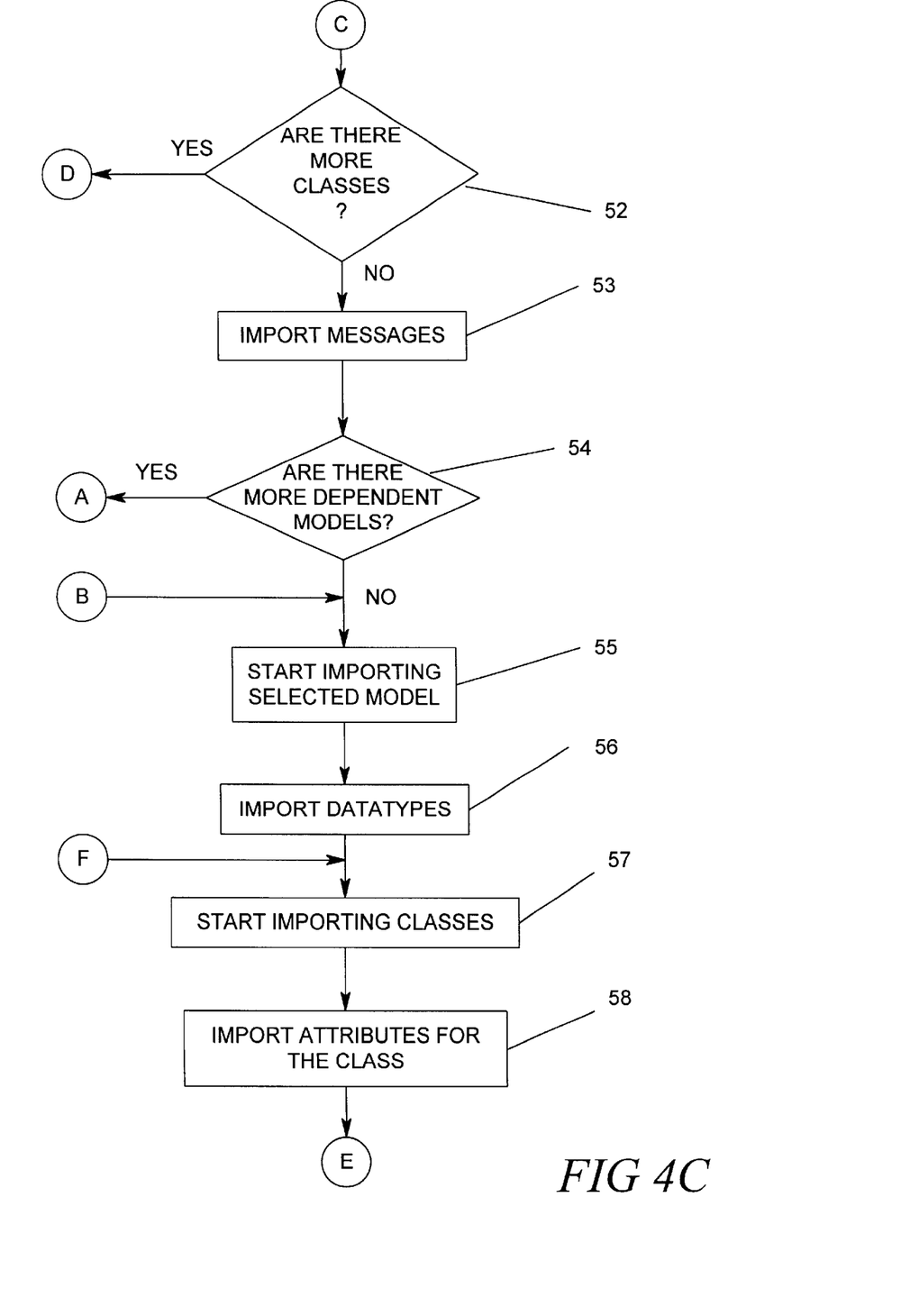

Referring now to FIG. 4C at the connector C, an inquiry is made as to whether or not there are more classes (diamond 52). If the answer to this inquiry is yes, then a branch is taken back to the process block 46 in FIG. 4B for processing the next class, as denoted by a connector D. On the other hand, if the answer to this inquiry is no, then messages are imported into the Rose model (block 53).

An inquiry is next made as to whether or not there are more dependent models (diamond 54). If the answer to this inquiry is yes, then a branch is made back to the process block 44 as denoted by the connector A. On the other hand, if the answer to this inquiry is no, then the process of importing the selected model is begun (block 55). At this juncture of the description, it is pointed out that if there are no dependent models (diamond 42, FIG. 4A), a branch is made to the process block 55 as denoted by the connector B. Next, datatypes are imported (block 56) followed by the starting of importing classes (block 57). After this, attributes for the class are imported (block 58) and the process illustration continues in FIG. 4D as denoted by a connector E.

Figure 4D:
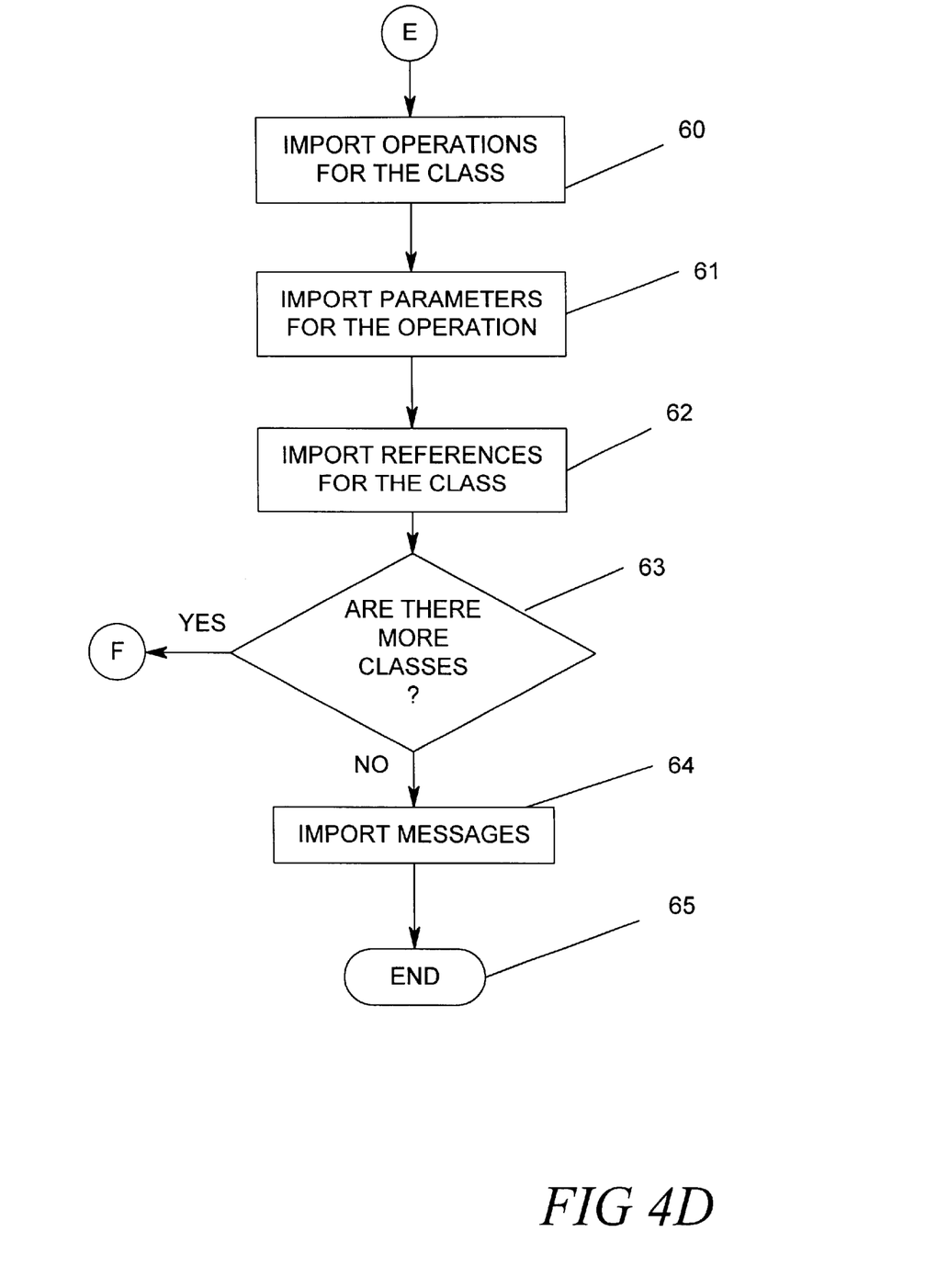

Referring now to FIG. 4D at the connector E, operations for the class are imported (block 60) and parameters for the operation are also imported (block 61). Next, reference for the class are imported (block 62) followed by an inquiry as to whether or not there are more classes (diamond 63). If there are more classes, then a branch is made to the process block 57 in FIG. 4C as denoted by a connector F. On the other hand, if the answer to this inquiry is no, then messages are imported (block 64) and the process ends (bubble 65).

Referring now to FIGS. 5A through 5D, a flow chart of the process for exporting a tool model from a third party modeling tool into the repository is shown. The process begins with a start bubble 70 followed by a step of getting LogIn parameters from the user (block 71). Next, an inquiry is made as to whether or not the parameters obtained are valid (diamond 72). If they are not valid, then errors are displayed (block 73) and the process ends (bubble 74). On the other hand, if the parameters are valid, then a LogIn is made to the repository UREP 22 (block 75). After this, the model to be exported to the UREP is selected (block 76). Next, dependent models of the selected models are found (block 77). An inquiry is then made as to whether or not there are any dependent models (diamond 78). If the answer to this inquiry is yes, then a branch is taken to FIG. 5B as denoted by a connector A. On the other hand, if the answer to this inquiry is no, then a branch is taken to another part of the process illustrated in FIG. 5B as denoted by a connector B.

Figure 5A:
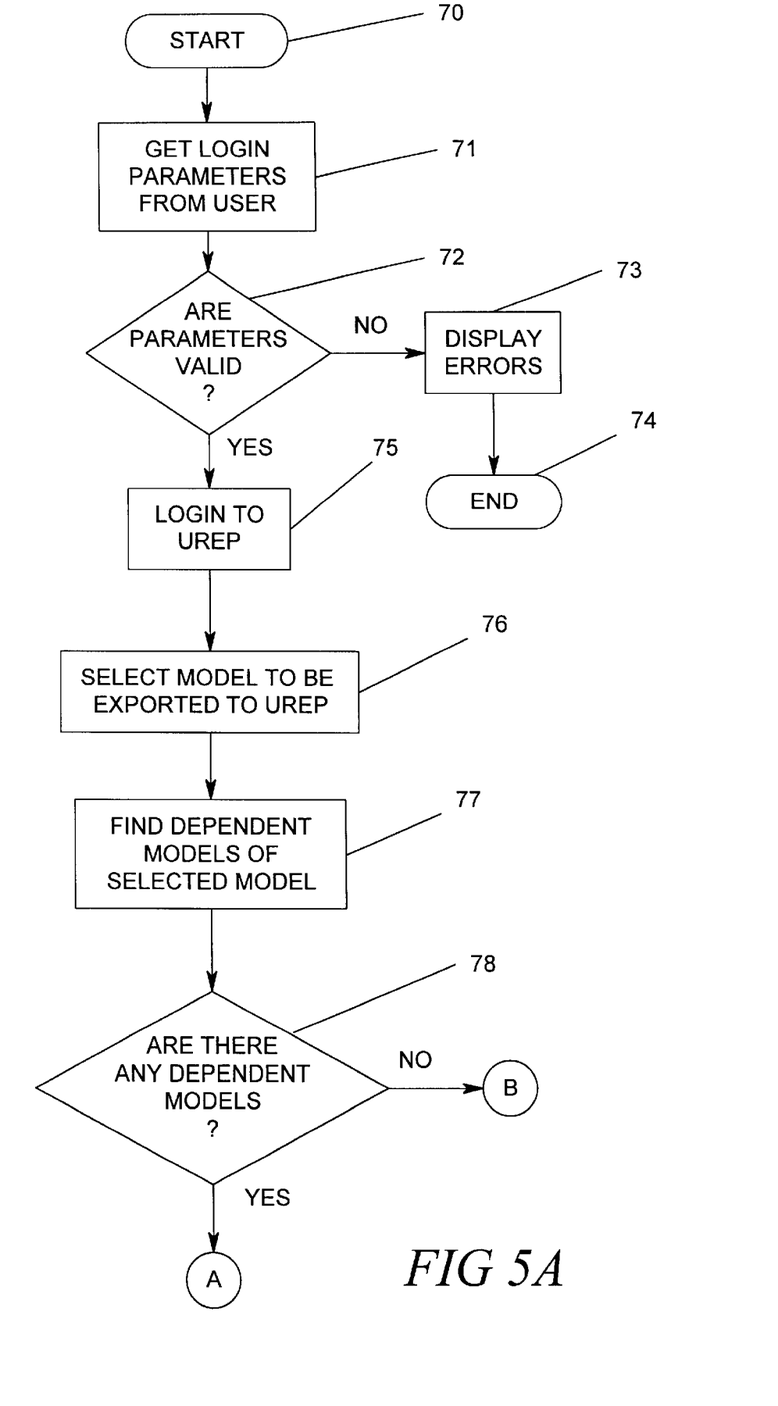
FIGS. 5A through 5D combined form a flow chart illustrating the process of exporting a third party modeling tool model into a repository through a third party modeling tool of one particular embodiment of the present invention.
Figure 5B:
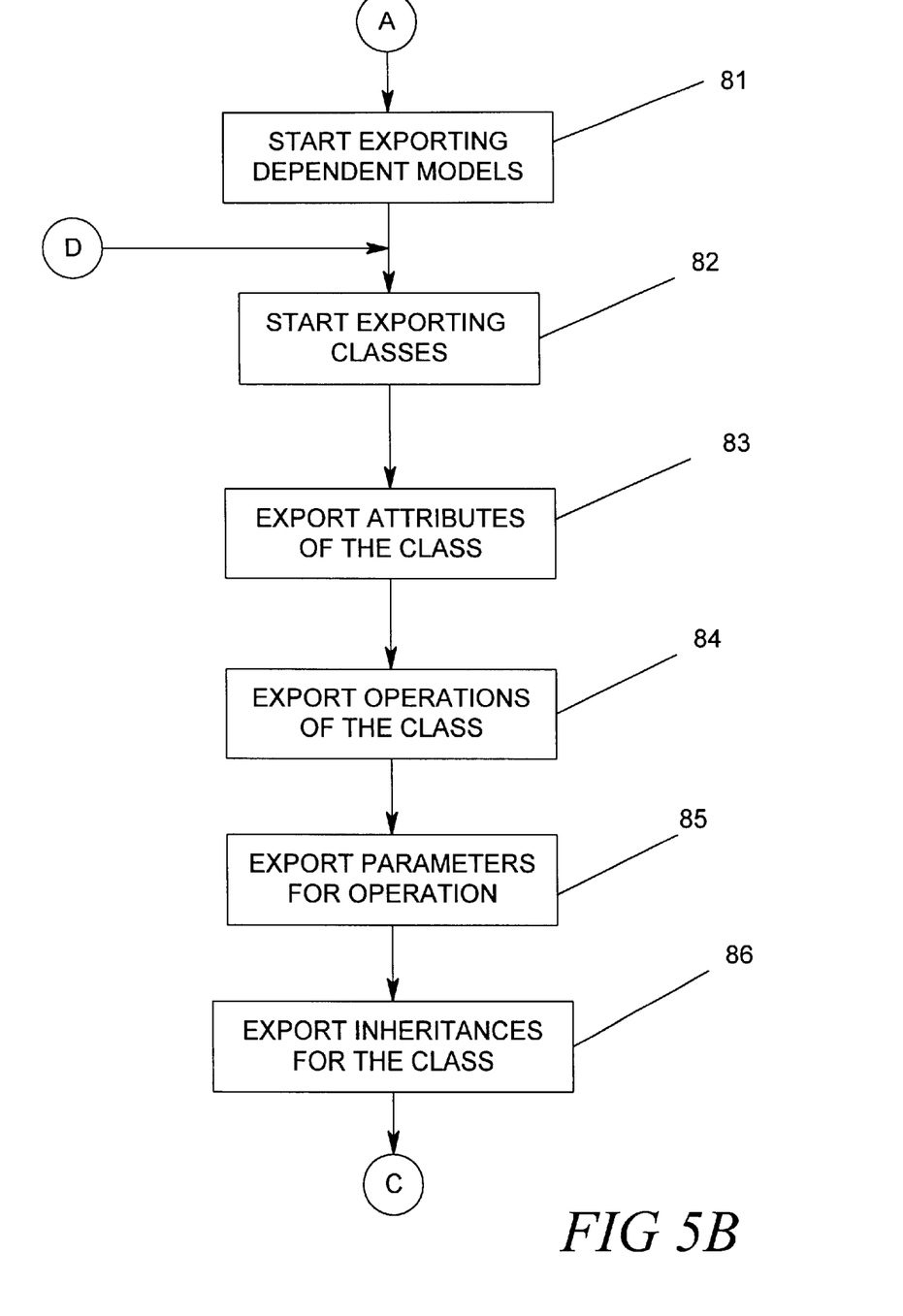

Referring now to FIG. 5B at the connector A, the step of exporting dependent models is begun (block 81). Next, the exporting of classes is begun (block 82) followed by a step of exporting attributes of the class (block 83). Operations of classes are exported next (block 84) followed by a step of exporting parameters for operations (block 85). Inheritances for the class are then exported (block 86). The process illustration continues in FIG. 5C as denoted by a connector C.

Figure 5C:
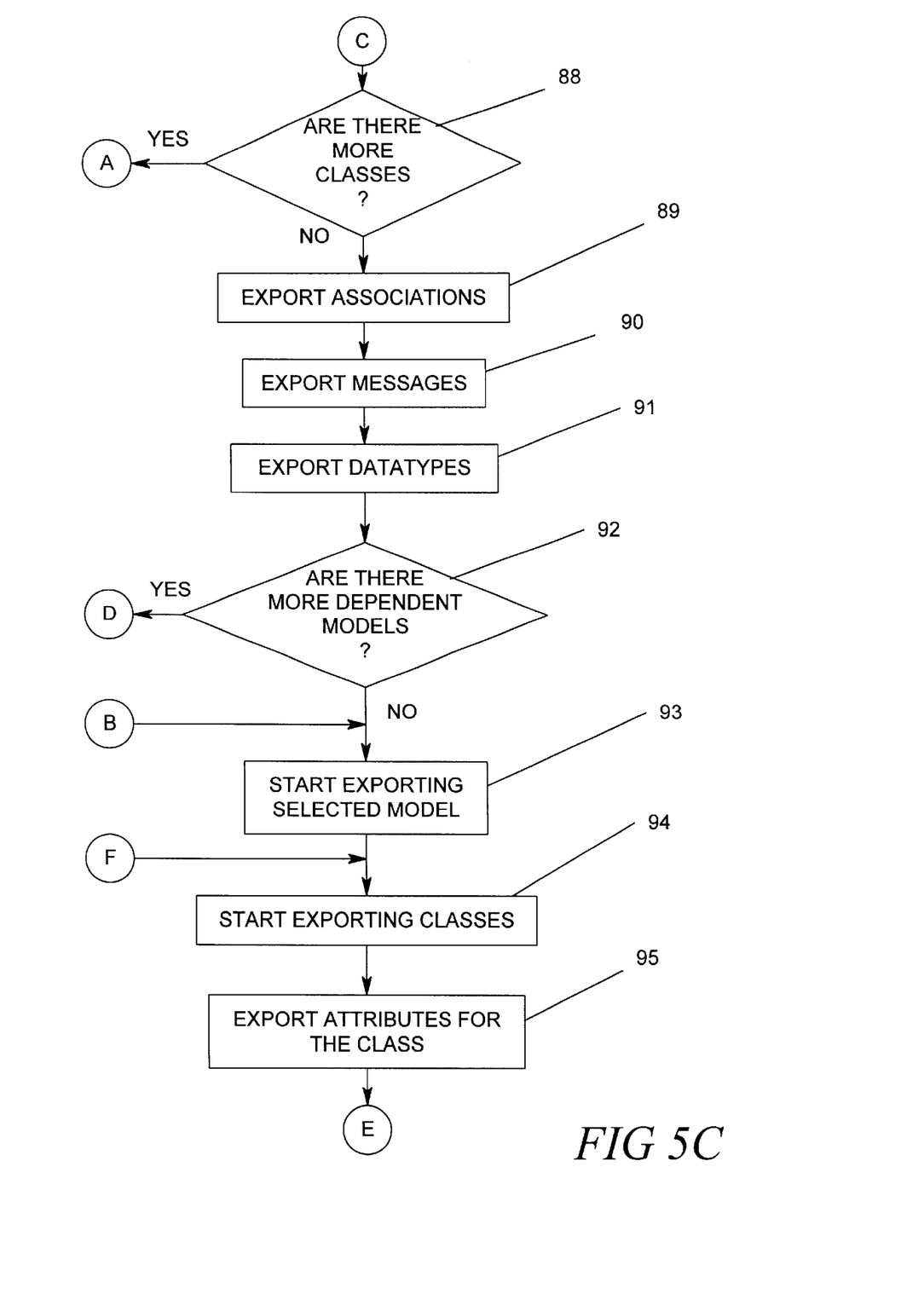

Referring now to FIG. 5C at the connector C, an inquiry is made as to whether or not there are more classes (diamond 88). If the answer to this inquiry is yes, then a branch is taken back to the process block 80 in FIG. 5B for processing the next class as denoted by the connector A. On the other hand, if the answer to this inquiry is no, then associations are exported (block 89), and messages (block 90) and datatypes (block 91) are exported into UREP as well.

An inquiry is next made as to whether or not there are more dependent models (diamond 92). If the answer to this inquiry is yes, then a branch is made back to the process block 82 as denoted by the connector D. On the other hand, if the answer to this inquiry is no, then the process of exporting models is begun (block 93). At this juncture of the description, it is pointed out that if there are no dependent models (diamond 78, FIG. 5A), a branch is made to the process block 93 as denoted by the connector B to export the selected model. Next, classes are starting to be exported (block 94). After this, attributes for the class are exported (block 95) and the process illustration continues in FIG. 5D as denoted by a connector E.

Figure 5D:
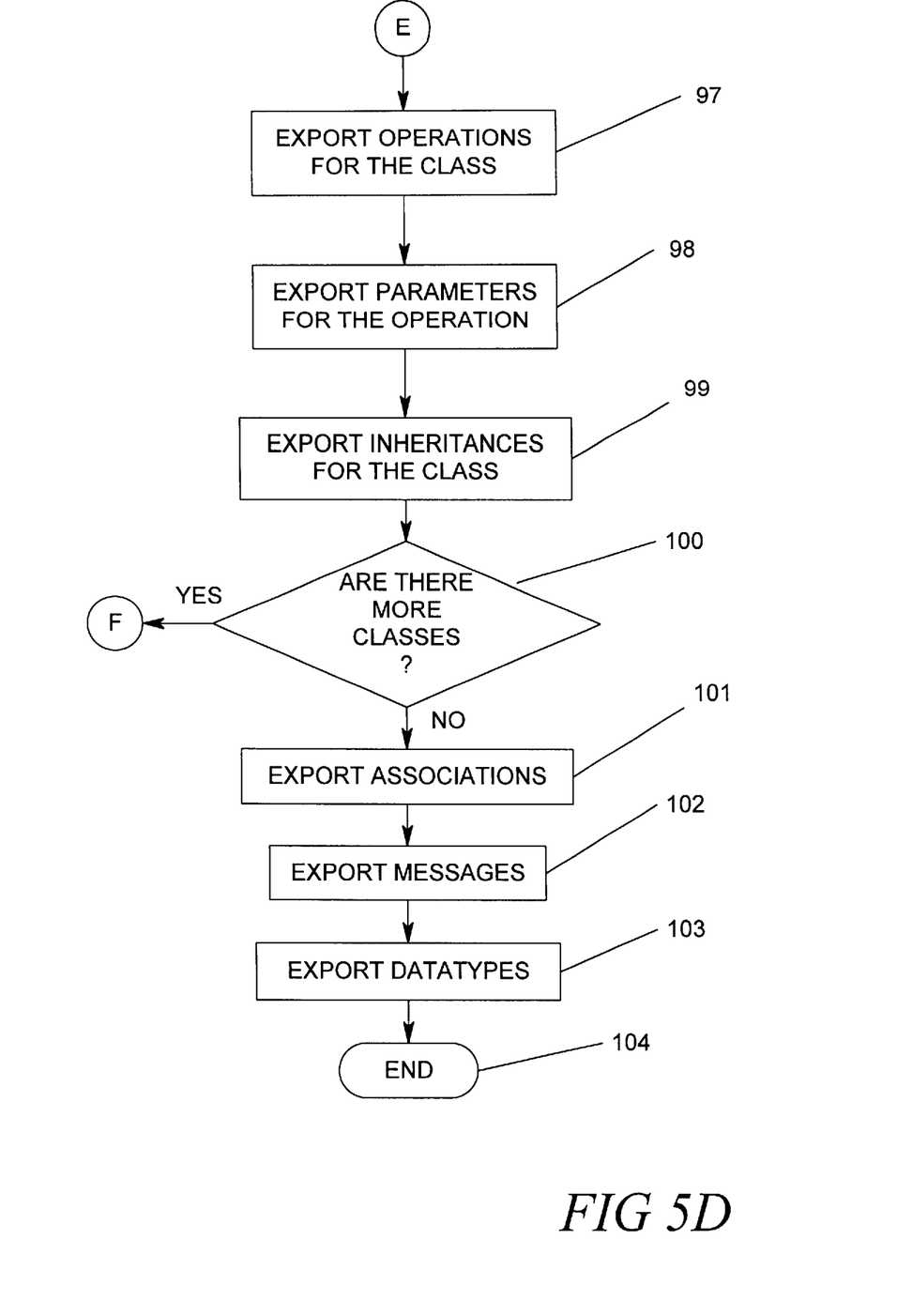

Referring now to FIG. 5D at the connector E, operations for the class are exported (block 97) and parameters for the operation are also exported (block 98). Next, inheritances for the class are exported (block 99) followed by an inquiry as to whether or not there are more classes (diamond 100). If there are more classes, then a branch is made to the process block 94 in FIG. 5C as denoted by a connector F. On the other hand, if the answer to this inquiry is no, then associations (block 101) and messages (block 102) are exported. After this, datatypes are exported as well (block 103) and the process ends (bubble 104).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In an object-oriented software development system having a repository, a method for integrating models residing in a software development tool with models in said repository, said method comprising the steps of:
   a. importing a first software model from said repository into said software development tool;
   b. disposing said imported first software model in said software development tool for development by a user into a second software model based upon said first software model; and when developed by said user,
   c. exporting said second software model from said software development tool back into said repository.

2. A method according to claim 1 wherein said step of importing further comprises the steps of:
   a.) finding a first dependent model for said first software model in said repository;
   b.) importing data-types of said first dependent model from said repository to said object-oriented tool;
   c.) importing classes of said first dependent model from said repository to said object-oriented tool;
   d.) importing references of said first dependent model from said repository to said object-oriented tool;
   e.) importing messages of said first dependent model from said repository to said object-oriented tool;
   f.) importing data-types of said first software model from said repository to said object-oriented tool;
   g.) importing classes of said first software model from said repository to said object-oriented tool;
   h.) importing references of said first software model from said repository to said object-oriented tool; and
   i.) importing messages of said first software model from said repository to said object-oriented tool.

3. A method according to claim 1 wherein said step of exporting further comprises the steps of:
   a.) finding a first dependent model for said second software model in said object-oriented tool;
   b.) exporting data-types of said first dependent model from said object-oriented tool to said repository;
   c.) exporting classes of said first dependent model from said object-oriented tool to said repository;
   d.) exporting associations of said first dependent model from said object-oriented tool to said repository;
   e.) exporting messages of said first dependent model from said object-oriented tool to said repository;
   f.) exporting data-types of said second software model from said object-oriented tool to said repository;
   g.) exporting classes of said second software model from said object-oriented tool to said repository;
   h.) exporting associations of said second software model from said object-oriented tool to said repository; and,
   i.) exporting messages of said second software model from said object-oriented tool to said repository.

4. A method according to claim 3 wherein said step of exporting data-types further comprises the steps of creating data-types required by said repository.

5. A method according to claim 3 wherein said step of exporting messages further comprises the step of creating said messages required by said repository.

6. A method according to claim 1 wherein said step of disposing further comprises the step of automatically creating characteristics required by said repository for said second software model.

7. A method according to claim 1 wherein said step of exporting further comprises the method of creating default values for parameters required by said repository.

8. A method as in claim 1 wherein said step of disposing further comprises the step of automatically creating properties for parameters for said second software model required by said repository.

9. In an object-oriented software development system having a repository, a method for populating models from a software development case tool into said repository, said method including the steps of:
   a. designing a software model through said software development case tool;
   b. building said software model through said software development case tool by automatically creating characteristics and properties of parameters for said software model, which are required by said repository, and when built,
   c. exporting said software model from said software development case tool to said repository.

10. A method according to claim 9 wherein said step of exporting further comprises the steps of:
   a.) finding a first dependent model for said software model in said object-oriented tool;
   b.) exporting data-types of said first dependent model from said object-oriented tool to said repository;
   c.) exporting classes of said first dependent model from said object-oriented tool to said repository;
   d.) exporting associations of said first dependent model from said object-oriented tool to said repository;
   e.) exporting messages of said first dependent model from said object-oriented tool to said repository;
   f.) exporting data-types of said software model from said object-oriented tool to said repository;
   g.) exporting classes of said second model from said object-oriented tool to said repository;
   h.) exporting associations of said software model from said object-oriented tool to said repository; and,
   i.) exporting messages of said software model from said object-oriented tool to said repository.

11. A method according to claim 10 wherein said step of exporting data-types further comprises the steps of creating data-types required by said repository.

12. A method according to claim 10 wherein said step of exporting messages further comprises the step of creating said messages required by said repository.

13. A method according to claim 9 wherein said step of exporting further comprises the method of creating default values for parameters required by said repository.

14. A program storage media encoded with machine-readable computer code for use in an object-oriented software development system having a repository, a method for integrating models residing in a software development tool with models in said repository, said method comprising the steps of:
   a. importing a first software model from said repository into said software development tool;
   b. disposing said imported first software model in said software development tool for development by a user into a second software model based upon said first software model; and once developed by said user,
   c. exporting said second software model from said software development tool back into said repository.

15. A storage media according to claim 14 wherein said step of importing further comprises the steps of:
   a.) finding a first dependent model for said first software model in said repository;
   b.) importing data-types of said first dependent model from said repository to said object-oriented tool;
   c.) importing classes of said first dependent model from said repository to said object-oriented tool;
   d.) importing references of said first dependent model from said repository to said object-oriented tool;
   e.) importing messages of said first dependent model from said repository to said object-oriented tool;
   f.) importing data-types of said first software model from said repository to said object-oriented tool;
   g.) importing classes of said first software model from said repository to said object-oriented tool;
   h.) importing references of said first software model from said repository to said object-oriented tool; and,
   i.) importing messages of said first software model from said repository to said object-oriented tool.

16. A storage media according to claim 14 wherein said step of exporting further comprises the steps of:
   a.) finding a first dependent model for said second software model in said object-oriented tool;
   b.) exporting data-types of said first dependent model from said object-oriented tool to said repository;
   c.) exporting classes of said first dependent model from said object-oriented tool to said repository;
   d.) exporting associations of said first dependent model from said object-oriented tool to said repository;
   e.) exporting messages of said first dependent model from said object-oriented tool to said repository;
   f.) exporting data-types of said second software model from said object-oriented tool to said repository;
   g.) exporting classes of said second software model from said object-oriented tool to said repository;
   h.) exporting associations of said second software model from said object-oriented tool to said repository; and,
   i.) exporting messages of said second software model from said object-oriented tool to said repository.

17. A storage media according to claim 16 wherein said step of exporting data-types further comprises the steps of creating data-types required by said repository.

18. A storage media according to claim 16 wherein said step of exporting messages further comprises the step of creating said messages required by said repository.

19. A storage media according to claim 14 wherein said step of disposing further comprises the step of automatically creating characteristics required by said repository for said second software model.

20. A storage media according to claim 14 wherein said step of exporting further comprises the method of creating default values for parameters required by said repository.

21. A storage media as in claim 14 wherein said step of disposing further comprises the step of automatically creating properties for parameters for said second software model required by said repository.

22. A program storage media encoded with machine-readable computer program code for use in an object-oriented software development system having a repository, a method for populating models from a software development case tool into said repository, said method including the steps of:
   a. designing a software model through said software development case tool;
   b. building said software model through said software development case tool by automatically creating characteristics and properties of parameters for said software model, which are required by said repository; and when built, c. exporting said software model from said software development case tool to said repository.

23. A storage media according to claim 22 wherein said step of exporting further comprises the steps of:
   a.) finding a first dependent model for said software model in said object-oriented tool;
   b.) exporting data-types of said first dependent model from said object-oriented tool to said repository;
   c.) exporting classes of said first dependent model from said object-oriented tool to said repository;
   d.) exporting associations of said first dependent model from said object-oriented tool to said repository;
   e.) exporting messages of said first dependent model from said object-oriented tool to said repository;
   f.) exporting data-types of said software model from said object-oriented tool to said repository;
   g.) exporting classes of said second model from said object-oriented tool to said repository;
   h.) exporting associations of said software model from said object-oriented tool to said repository; and,
   i.) exporting messages of said software model from said object-oriented tool to said repository.

24. A storage media according to claim 23 wherein said step of exporting data-types further comprises the steps of creating data-types required by said repository.

25. A storage media according to claim 23 wherein said step of exporting messages further comprises the step of creating said messages required by said repository.

26. A storage media according to claim 22 wherein said step of exporting further comprises the method of creating default values for parameters required by said repository.

* * * * *